(12) United States Patent
Tomokuni et al.

(10) Patent No.: US 11,749,001 B2
(45) Date of Patent: Sep. 5, 2023

(54) BEHAVIOR CONTROL SYSTEM

(71) Applicant: HONDA MOTOR CO., LTD., Tokyo (JP)

(72) Inventors: Yasuhiko Tomokuni, Saitama (JP); Shuichi Okada, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 210 days.

(21) Appl. No.: 17/212,181

(22) Filed: Mar. 25, 2021

(65) Prior Publication Data

US 2021/0303918 A1 Sep. 30, 2021

(30) Foreign Application Priority Data

Mar. 31, 2020 (JP) .............................. JP2020-062618

(51) Int. Cl.
*G06V 20/56* (2022.01)
*H04L 12/40* (2006.01)
(Continued)

(52) U.S. Cl.
CPC .......... *G06V 20/588* (2022.01); *G06F 18/213* (2023.01); *G06V 10/40* (2022.01);
(Continued)

(58) Field of Classification Search
CPC ...... G06K 9/6232; G06V 10/22; G06V 10/40; G06V 20/588; H04L 12/40;
(Continued)

(56) References Cited

U.S. PATENT DOCUMENTS 6,985,619 B1 * 1/2006 Seta ....................... H04N 13/25
348/E13.016
10,162,361 B2 12/2018 Sakamoto et al.
(Continued)

FOREIGN PATENT DOCUMENTS

JP 2011022995 A 2/2011
JP 2012173874 A 9/2012
(Continued)

OTHER PUBLICATIONS

Notice of Reasons for Refusal for Patent Application JP 2020-062618 dated Feb. 1, 2022; 6 pp.

*Primary Examiner* — Santiago Garcia
(74) *Attorney, Agent, or Firm* — Armstrong Teasdale LLP

(57) ABSTRACT

A behavior control system includes: a behavior control device for changing a behavior of a moving body; an imaging device for acquiring images ahead of the moving body; and a control device for controlling the behavior of the moving body based on the images acquired by the imaging device. The control device includes: a feature point extraction unit configured to extract feature points from the images acquired by the imaging device; a straight moving state storing unit configured to store, as a reference feature point state, a feature point state when the moving body is in a straight moving state, the feature point state being obtained based on a temporal change of the feature points; and a moving body control unit configured to control the behavior control device when the feature point state obtained based on the temporal change of the feature points differs from the reference feature point state.

7 Claims, 4 Drawing Sheets

(51) Int. Cl.
*G06F 18/213* (2023.01)
*G06V 10/40* (2022.01)

(52) U.S. Cl.
CPC .... *H04L 12/40* (2013.01); *H04L 2012/40215* (2013.01); *H04L 2012/40273* (2013.01)

(58) Field of Classification Search
CPC ........... H04L 2012/40215; H04L 2012/40273; B60W 30/12
See application file for complete search history.

(56) References Cited

U.S. PATENT DOCUMENTS

| | | | |
|---|---|---|---|
| 2010/0097455 A1* | 4/2010 | Zhang | G06V 20/588 701/25 |
| 2012/0099763 A1* | 4/2012 | Katoh | G06V 10/22 382/103 |
| 2012/0213412 A1 | 8/2012 | Murashita | |
| 2017/0225609 A1* | 8/2017 | Tsuzuki | F21S 41/657 |
| 2018/0247423 A1* | 8/2018 | Suzuki | G06T 5/50 |
| 2020/0026960 A1* | 1/2020 | Park | G06V 10/776 |
| 2020/0192396 A1* | 6/2020 | Lee | G01C 21/14 |
| 2020/0262424 A1* | 8/2020 | Kong | G01C 21/20 |
| 2020/0285863 A1* | 9/2020 | Sadjadi | G06T 7/73 |
| 2021/0316751 A1* | 10/2021 | Huberman | G05D 1/0214 |

FOREIGN PATENT DOCUMENTS

| | | | |
|---|---|---|---|
| JP | 2017144769 A | 8/2017 | |
| JP | 2019194037 A | 11/2019 | |

* cited by examiner

BEHAVIOR CONTROL SYSTEM

TECHNICAL FIELD

The present invention relates to a behavior control system configured to control the behavior of a moving body such as a motor vehicle.

BACKGROUND ART

A vehicle control device that performs control to keep a vehicle within a lane where the vehicle is traveling is known (for example, JP2017-144769A). The vehicle control device disclosed in JP2017-144769A controls the steering mechanism of the vehicle so as to reduce the distance between the widthwise center position of the lane and the position where the vehicle is traveling in the lane.

It may be conceived to use the vehicle control device disclosed in JP2017-144769A to perform travel control such that the vehicle travels straight along a straight lane. In this case, if the boundary (lane markings) of the travel lane is unclear or the boundary of the travel lane meanders (or zigzags), the widthwise center of the travel lane may not be properly determined. Therefore, the vehicle may not stably travel straight, resulting in wobbling of the vehicle in the vehicle width direction.

SUMMARY OF THE INVENTION

In view of the foregoing background, an object of the present invention is to provide a behavior control system for a moving body which can make the moving body move straight in a stable manner.

Means to Accomplish the Task

To achieve the above object, one embodiment of the present invention provides a behavior control system (1) for a moving body, comprising: a behavior control device (2) configured to change a behavior of the moving body; an imaging device (3) configured to acquire images in front of the moving body; and a control device (5) configured to control the behavior of the moving body based on the images acquired by the imaging device, wherein the control device comprises: a feature point extraction unit (11) configured to extract feature points from the images acquired by the imaging device; a straight moving state storing unit (12) configured to store, as a reference feature point state, a feature point state when the moving body is in a straight moving state, the feature point state being obtained based on a temporal change of the feature points; and a moving body control unit (16) configured to control the behavior control device when the feature point state obtained based on the temporal change of the feature points differs from the reference feature point state.

According to this configuration, presence or absence of an inclination of the moving body (rotation of the moving body about an axis extending in the vertical direction) relative to when the moving body is in the straight moving state can be determined based on the temporal change of the feature points. Further, based on the temporal change of the feature points, the moving body is controlled such that the orientation of the moving body coincides with the orientation of the moving body when the moving body is in the straight moving state. Therefore, even when the boundary of the region within which the moving body should move (for example, the boundary of the travel lane) cannot be recognized, it is possible to make the moving body travel straight in a stable manner.

In the above configuration, preferably, the straight moving state storing unit is configured to store, as a reference vanishing point (O), a vanishing point (Q) detected in the images when the moving body is in the straight moving state, and the moving body control unit is configured to control the behavior control device such that the feature points move in directions spreading radially from the reference vanishing point.

According to this configuration, it is possible to reliably make the orientation of the moving body coincide with the orientation of the moving body when the moving body is in the straight moving state.

In the above configuration, preferably, the moving body control unit is configured to control the behavior control device when the feature point state obtained based on the temporal change of the feature points differs from a state in which the feature points move in the directions spreading radially from the reference vanishing point.

According to this configuration, it is possible to control the moving body when the moving state of the moving body has changed from the straight moving state.

In the above configuration, preferably, the control device is provided with a movement amount acquisition unit (15) configured to calculate a movement amount of the moving body in a lateral direction based on the temporal change of the feature points, and the moving body control unit is configured to control the behavior control device so as to make the movement amount zero.

According to this configuration, the position of the moving body in the lateral direction can be made to match that of the moving body in the straight moving state.

In the above configuration, preferably, the moving body control unit is configured to control the behavior control device so as to make the movement amount zero after controlling the behavior control device such that the feature points move in the directions spreading radially from the reference vanishing point.

According to this configuration, even when the position of the moving body in the lateral direction has shifted due to correction of the inclination thereof, it is possible to correct the movement amount of the moving body in the lateral direction so that the lateral position of the moving body matches that of the moving object in the straight moving state.

Effects of the Invention

According to the foregoing configuration, it is possible to provide a behavior control system for a moving body which can make the moving body move straight in a stable manner.

DESCRIPTION OF THE PREFERRED EMBODIMENT(S)

In the following, an embodiment of the present invention will be described in detail with reference to the drawings.

A behavior control system 1 according to the embodiment of the present invention is installed in a moving body such as a motor vehicle. In the following, description will be made of a case where the behavior control system 1 is installed in a motor vehicle. The behavior control system 1 installed in the motor vehicle functions to make the motor vehicle autonomously travel straight along a straight travel lane (the motor vehicle will be simply referred to as the "vehicle" hereinafter).

Figure 1:
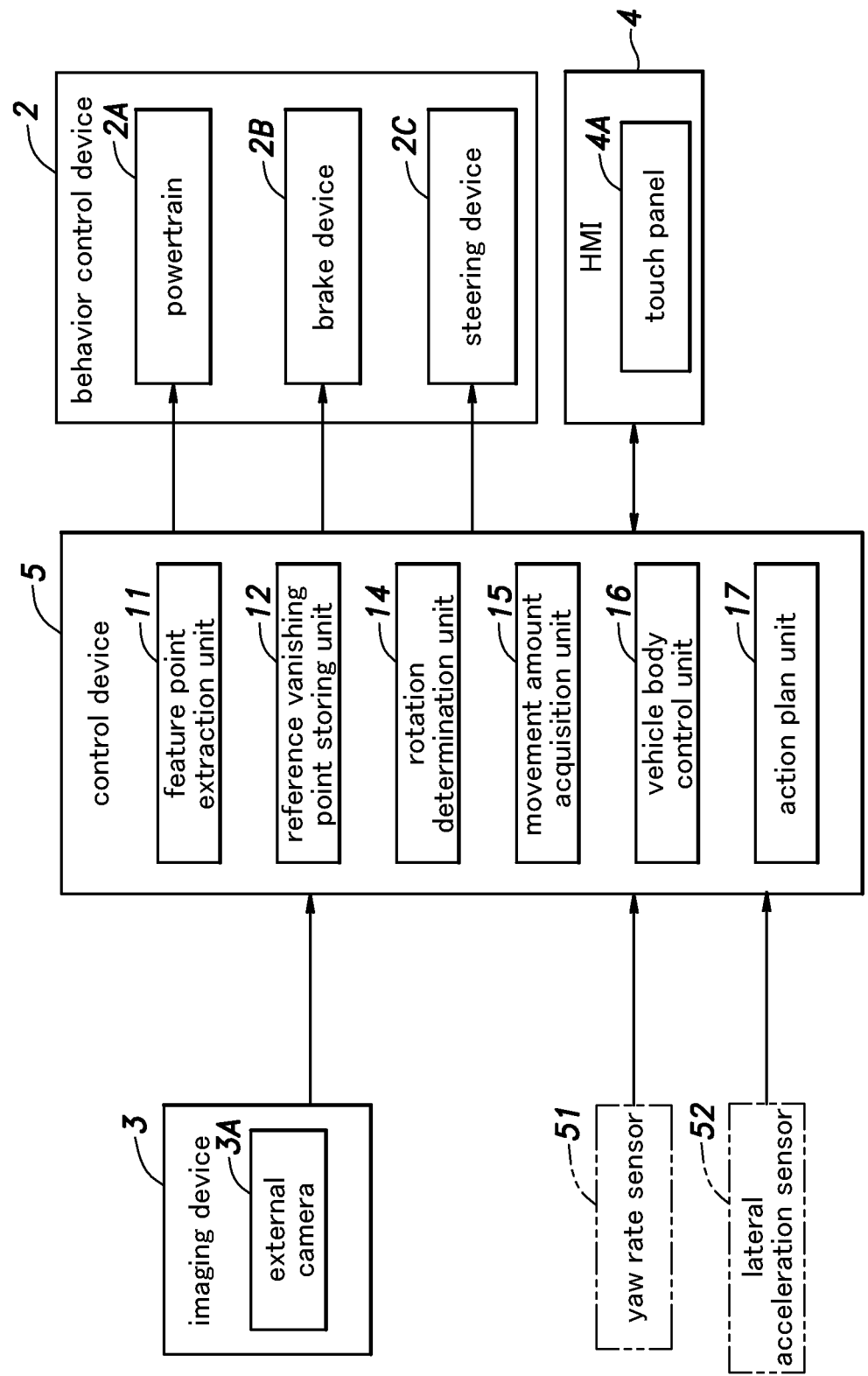
FIG. 1 is a functional block diagram of a behavior control system according to an embodiment of the present invention.

As shown in FIG. 1, the behavior control system 1 includes a behavior control device 2, an imaging device 3, a human machine interface (HMI) 4, and a control device 5. The above components of the behavior control system 1 are connected to each other so that signals can be transmitted therebetween via a communication means such as a Controller Area Network (CAN).

The behavior control device 2 includes a powertrain 2A, a brake device 2B, and a steering device 2C. The powertrain 2A is a device configured to apply a driving force to the vehicle. The powertrain 2A includes a power source and a transmission, for example. The power source includes at least one of an internal combustion engine, such as a gasoline engine and a diesel engine, and an electric motor. The brake device 2B is a device configured to apply a brake force to the vehicle. For example, the brake device 2B includes a brake caliper configured to press a brake pad against a brake rotor and an electric cylinder configured to supply an oil pressure to the brake caliper to drive the brake caliper. The brake device 2B may include an electric parking brake device configured to restrict rotations of wheels via wire cables.

The steering device 2C is a device for changing a steering angle of the wheels. For example, the steering device 2C includes a rack-and-pinion mechanism configured to steer (turn) the wheels and an electric motor configured to drive the rack-and-pinion mechanism. The powertrain 2A, the brake device 2B, and the steering device 2C are controlled by the control device 5.

The imaging device 3 serves as an external environment information acquisition device for detecting electromagnetic waves (such as visible light), sound waves, and the like from the surroundings of the vehicle to acquire images in front of the vehicle body of the vehicle. The imaging device 3 includes an external camera 3A and outputs the acquired images to the control device 5.

The external camera 3A is a device configured to capture images in front of the vehicle with respect to the travel direction, and consists of a digital camera using a solid imaging element such as a CCD or a CMOS, for example. The external camera 3A is fixed in the vehicle cabin such that the camera optical axis thereof is directed in the forward direction of the vehicle with respect to the travel direction.

Note that the imaging device 3 may include a sonar, a millimeter wave radar, and/or a laser lidar instead of or in addition to the external camera 3A. The sonar, the millimeter wave radar, and the laser lidar respectively emit ultrasonic waves, millimeter waves, and laser in the forward direction of the vehicle and capture the reflected waves to acquire the images in front of the vehicle with respect to the travel direction. The imaging device 3 may include multiple sonars, multiple millimeter wave radars, and/or multiple laser lidars arranged to jointly acquire the images in front of the vehicle.

The HMI 4 is an input/output device for receiving an input operation by the occupant and notifying the occupant of various kinds of information by display and/or voice. The HMI 4 includes, for example, a touch panel 4A that includes a display screen such as a liquid crystal display or an organic EL display and is configured to receive the input operation by the occupant. The HMI 4 also includes various switches configured to receive the input operation by the occupant.

The control device 5 consists of an electronic control unit (ECU) that includes a CPU, a nonvolatile memory such as a ROM, a volatile memory such as a RAM, and the like. The CPU executes operation processing according to a program so that the control device 5 executes various types of vehicle control. The control device 5 may consist of one piece of hardware, or may consist of a unit including multiple pieces of hardware. Further, as a result of execution of the program by the hardware constituting the control device 5, such as an LSI, an ASIC, or an FPGA, various functional units each performing a prescribed function are configured in the control device 5.

The control device 5 controls the powertrain 2A, the brake device 2B, and the steering device 2C (the behavior control device 2) based on the images acquired by the imaging device 3, thereby to control the behavior of the vehicle (moving body). In the present embodiment, the control device 5 controls the behavior of the vehicle such that the vehicle autonomously travels along the travel lane at a specified widthwise position in the travel lane. To execute such control, the control device 5 includes, as functional units thereof, a feature point extraction unit 11, a reference vanishing point storing unit 12, a rotation determination unit 14, a movement amount acquisition unit 15, a vehicle body control unit 16, and an action plan unit 17, as shown in FIG. 1.

The feature point extraction unit 11 analyzes the images acquired by the external camera 3A included in the imaging device 3 according to a known method to extract feature points P in the images. The feature point extraction unit 11 preferably extracts, as the feature points P, points in the images that can be easily discriminated, such as spot points and corners of the buildings in the images where the color and/or brightness change suddenly compared to other areas in the images.

Figure 2:
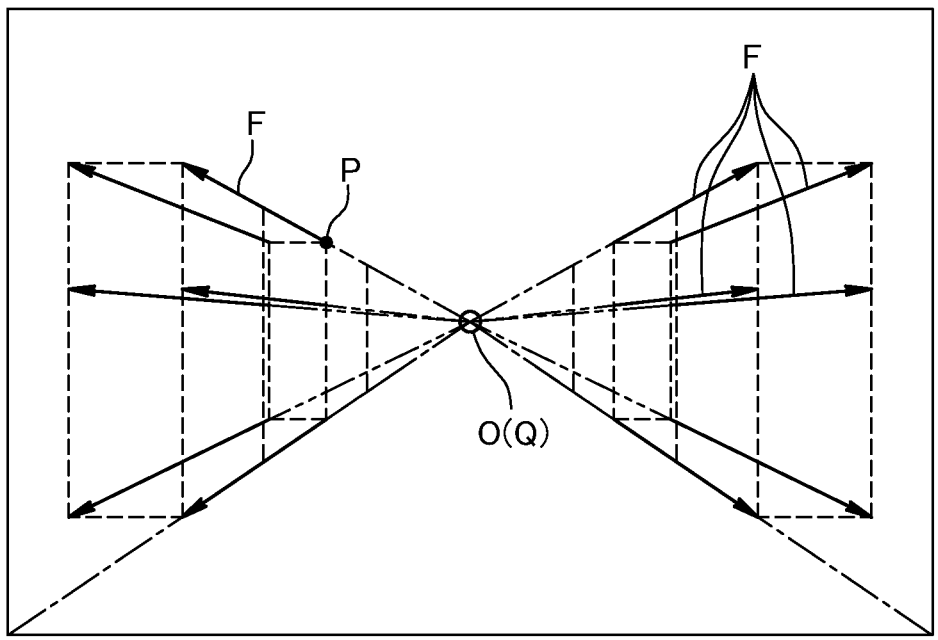
FIG. 2 is an explanatory diagram for explaining the relationship between feature points, optical flows, and a vanishing point.

As shown in FIG. 2, the movement of the feature points P can be expressed by optical flows F. Each optical flow F corresponds to a difference vector defined by the current position of a certain feature point P in the captured images and the position of the same feature point P a prescribed time before; that is, corresponds to a velocity vector of the feature point P. In the following description, the mode of movement represented by the optical flows F will be referred to as a feature point state.

The reference vanishing point storing unit 12 (which serves as a straight moving state storing unit) stores a position of a vanishing point Q which is detected in the images acquired by the external camera 3A when the vehicle is traveling straight in the forward direction of the vehicle body or when the vehicle is in a straight moving state. The reference vanishing point storing unit 12 also stores the mode of movement of the feature point P (feature point state) at the same time as when storing the position of the vanishing point Q. In the following description, the vanishing point Q whose position is stored in the reference vanishing point storing unit 12 will be referred to as a reference vanishing point O, and the feature point mode stored in the reference vanishing point storing unit 12 will be referred to as a reference feature point state. Also, the straight moving state of the vehicle corresponding to the reference vanishing point O and the reference feature point state stored in the reference vanishing point storing unit 12 may be referred to as a reference straight moving state. As shown in FIG. 2, when the vehicle is in the reference straight moving state, the feature points P move so as to spread radially from the reference vanishing point O, in other words, each feature point P moves in a direction away from the reference vanishing point O on the straight line connecting the feature point P with the reference vanishing point O.

Figure 3A:
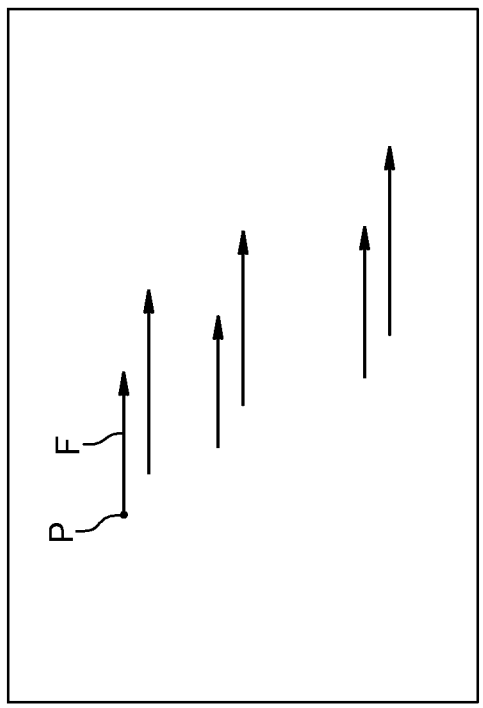
FIG. 3A is an explanatory diagram showing the movement of the feature points when the vehicle is steered to the left relative to the travel direction and the steering angle is at a relatively large non-zero angle.
Figure 3B:
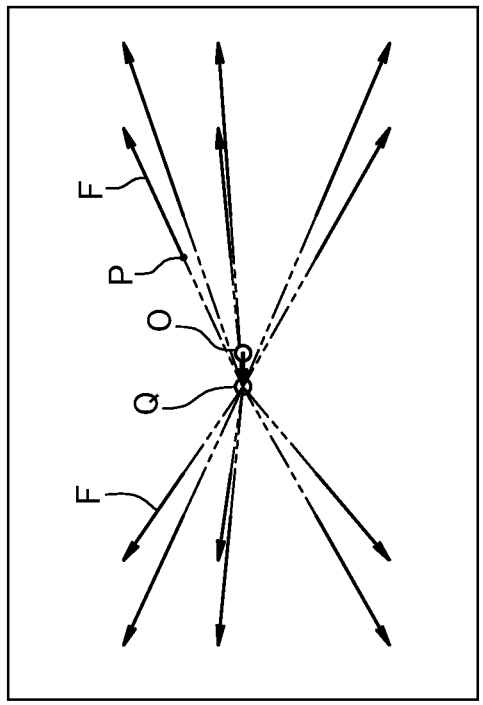
FIG. 3B is an explanatory diagram showing the movement of the feature points when the steering angle becomes zero or close to zero after the state of FIG. 3A.

If the vehicle is steered to the left when the vehicle is in the reference straight moving state, the vehicle body rotates about an axis extending in the vertical direction so that the vehicle inclines to the left relative to the travel direction of the vehicle in the reference straight moving state. At this time, while the steering angle is at a relatively large non-zero angle (here, it is assumed that the steering angle is defined with reference to when the vehicle is traveling straight in the forward direction of the vehicle body; namely, the steering angle is zero when the vehicle is traveling straight in the forward direction of the vehicle body), the feature points P move (or flow) to the right, as shown in FIG. 3A. When the steering angle is returned to zero or close to zero, the vanishing point Q is restored, as shown in FIG. 3B. At this time, however, the vanishing point Q may be positioned to the left of the reference vanishing point O. This distance between the vanishing point Q and the reference vanishing point O corresponds to the movement amount (movement distance) of the vehicle body in the left direction from when the vehicle was in the reference straight moving state.

Figure 3C:
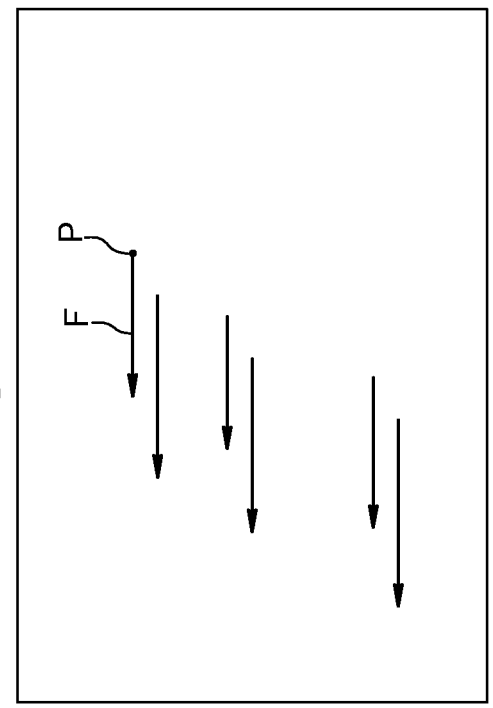
FIG. 3C is an explanatory diagram showing the movement of the feature points when the vehicle is steered to the right relative to the travel direction and the steering angle is at a relatively large non-zero angle.
Figure 3D:
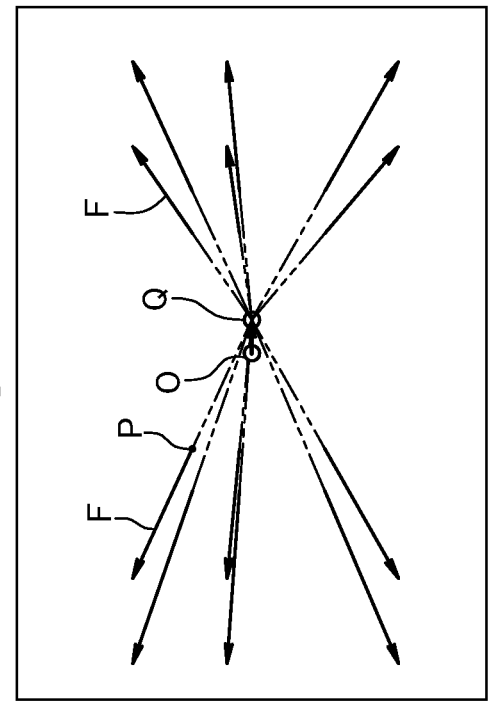
FIG. 3D is an explanatory diagram showing the movement of the feature points when the steering angle becomes zero or close to zero after the state of FIG. 3C.

If the vehicle is steered to the right when the vehicle is in the reference straight moving state, the vehicle body rotates about an axis extending in the vertical direction so that the vehicle inclines to the right relative to the travel direction of the vehicle in the reference straight moving state. At this time, while the steering angle is at a relatively large non-zero angle other than zero, the feature points P move (or flow) to the left, as shown in FIG. 3C. When the steering angle is returned to zero or close to zero, the vanishing point Q is restored, as shown in FIG. 3D. At this time, however, the vanishing point Q may be positioned to the right of the reference vanishing point O. This distance between the vanishing point Q and the reference vanishing point O corresponds to the movement amount (movement distance) in the right direction of the vehicle body from when the vehicle was in the reference straight moving state. Thus, when the feature points P are moving to the left or right, the feature point state differs from the reference feature point state, that is, the feature point state when the vehicle is in the reference straight moving state.

Based on such differences between the successively obtained feature point state and the reference feature point state, the rotation determination unit 14 detects presence or absence of an inclination (rotation) of the vehicle relative to when the vehicle is in the reference straight moving state and the direction of the inclination. More specifically, when the feature points P are moving radially from the vanishing point Q, which may be the reference vanishing point O, and the position of the vanishing point Q is stable at a constant position, the rotation determination unit 14 determines that the vehicle is in the straight moving state. When the feature points P are moving in the left direction, the rotation determination unit 14 determines that the vehicle is turning right and is inclined (in yaw rotation) rightward relative to the travel direction of the vehicle in the straight moving state. When the feature points P are moving in the right direction, the rotation determination unit 14 determines that the vehicle is turning left and is inclined leftward relative to the travel direction of the vehicle in the straight moving state. In addition to detecting the presence or absence of the inclination of the vehicle and the direction of the inclination, the rotation determination unit 14 acquires an amount of inclination (rotation) of the vehicle based on the movement of the feature points P.

The movement amount acquisition unit 15 acquires, based on the distance between the vanishing point Q and the reference vanishing point O, the movement amount (movement distance) of the vehicle in the lateral direction (left and right direction) from when the vehicle was in the reference straight moving state. When the distance between the vanishing point Q and the reference vanishing point O is zero, the movement amount acquisition unit 15 calculates that the movement amount of the vehicle in the lateral direction is zero.

The vehicle body control unit 16 (which serves as a moving body control unit) controls the powertrain 2A, the brake device 2B, and the steering device 2C based on the inclination of the vehicle acquired by the rotation determination unit 14 and the movement amount of the vehicle in the lateral direction acquired by the movement amount acquisition unit 15. Thereby, the vehicle body control unit 16 (moving body control unit) changes the behavior of the vehicle (moving body).

When there is an input to the HMI 4, the action plan unit 17 executes a process to make the vehicle travel autonomously. Specifically, when the vehicle is traveling straight on a straight travel lane, if the occupant performs a prescribed input operation with the HMI 4 to make the vehicle continue the straight travel, the reference vanishing point storing unit 12 stores the position of the vanishing point Q as the reference vanishing point O and the feature point state as the reference feature point state, and thereafter, the action plan unit 17 performs a straight travel control process. In the following, details of the straight travel control process will be described with reference to FIG. 4.

In the first step ST1 of the straight travel control process, the action plan unit 17 makes the rotation determination unit 14 acquire the inclination of the vehicle and determine whether the vehicle is traveling straight. In a case where the feature points P are moving radially from the vanishing point Q, which may be the reference vanishing point O, and the rotation determination unit 14 accordingly determines that the vehicle is traveling straight, the action plan unit 17 executes step ST2. Otherwise, namely, when the feature points P are moving in the right or left direction and the rotation determination unit 14 accordingly determines that the vehicle is turning right or left, the action plan unit 17 executes step ST3.

In step ST2, the action plan unit 17 makes the movement amount acquisition unit 15 acquire, based on the distance between the vanishing point Q and the reference vanishing point O, the movement amount of the vehicle body in the lateral direction from when the vehicle was in the reference straight moving state, namely, from when the straight travel control process was started. When the distance between the vanishing point Q and the reference vanishing point O is zero and hence it is determined that the movement amount of the vehicle body in the lateral direction is zero, the action plan unit 17 executes step ST5, and otherwise executes step ST4.

In step ST3, the action plan unit 17 makes the vehicle body control unit 16 control the steering device 2C, the powertrain 2A, and the brake device 2B so that the inclination of the vehicle becomes zero. More specifically, the action plan unit 17 makes the vehicle body control unit 16 control the steering device 2C, the powertrain 2A, and the brake device 2B so that the feature points P move to spread radially from the vanishing point Q and the position of the vanishing point Q becomes stable at a constant position. When the state in which the feature points P spreads radially from the vanishing point Q, namely, the state in which the vehicle travels straight in the forward direction of the vehicle body is achieved, the action plan unit 17 executes step ST5.

In step ST4, the action plan unit 17 makes the vehicle body control unit 16 control the steering device 2C, the powertrain 2A, and the brake device 2B so that the movement amount of the vehicle body in the lateral direction from when the vehicle was in the reference straight moving state acquired by the movement amount acquisition unit 15 becomes zero. When the movement amount of the vehicle body in the lateral direction becomes zero, the action plan unit 17 executes step ST5.

In step ST5, the action plan unit 17 determines whether to continue the straight travel control process. For example, when an input to stop the straight travel control process is received by the HMI 4 from the occupant, the action plan unit 17 determines that the straight travel control process should not be continued. If it is determined that the straight travel control process should not be continued, the action plan unit 17 ends the straight travel control process, and otherwise, returns to step ST1.

Next, effects of the behavior control system 1 configured as above will be described. When the vehicle turns and the moving state of the vehicle changes from when the vehicle is in the straight moving state (reference straight moving state), the feature point state changes from the state in which the feature points P move to spread radially from the reference vanishing point O, and the rotation determination unit 14 detects that an inclination of the vehicle has occurred due to the change of the moving state of the vehicle from the reference straight moving state (ST1: No). Thus, regardless of whether the boundary of the travel lane can be recognized, control of the vehicle can be started when the moving state of the vehicle has changed from the straight moving state, in accordance with the state of the feature points P.

When the moving state of the vehicle has changed from the reference straight moving state and an inclination of the vehicle has occurred (ST1: No), the vehicle is controlled such that the feature points P move so as to spread radially from the vanishing point Q and the position of the vanishing point Q becomes stable at a constant position (ST3). Thereby, the vehicle is put back in the straight moving state. Namely, the vehicle is controlled based on the temporal change of the feature points P, and therefore, regardless of whether the boundary of the travel lane can be recognized, the vehicle can be controlled to keep the straight moving state. Thus, even in a case where the boundary of the travel lane cannot be recognized and it is difficult to make the vehicle travel straight based on the boundary of the travel lane, it is possible to make the vehicle travel straight in a stable manner.

When the vehicle is traveling straight (ST1: Yes) and the distance between the vanishing point Q and the reference vanishing point O is not zero (ST2: No), the vehicle is controlled so that the movement amount of the vehicle in the lateral direction from when the vehicle was in the reference straight moving state becomes zero (ST4). In this way, the vehicle is controlled based on the distance between the vanishing point Q and the reference vanishing point O, and therefore, regardless of whether the boundary of the travel lane can be recognized, the vehicle can be controlled such that the position of the vehicle in the lateral direction matches that of the vehicle in the reference straight moving state (when the straight travel control process was started).

Figure 4:
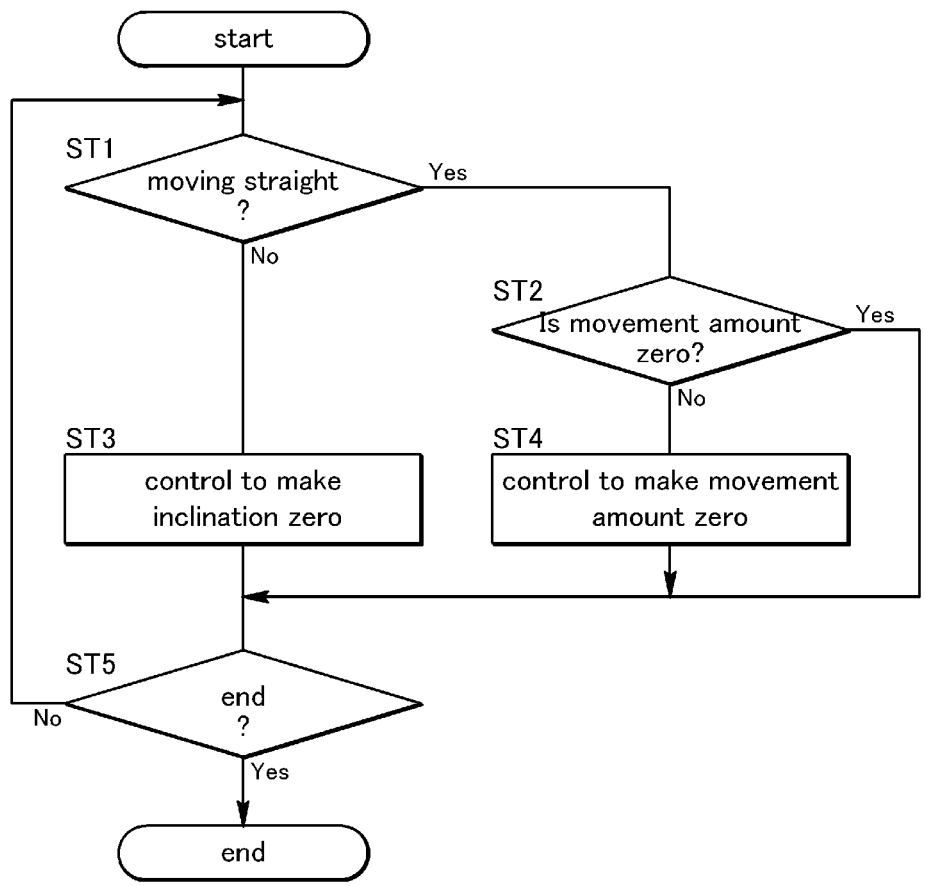
FIG. 4 is a flowchart of a straight travel control process.

As shown in FIG. 4, after the inclination of the vehicle is corrected and the straight moving state is restored (ST3), if it is determined that the straight travel control process should be continued (ST5: No), the vehicle is controlled so that the movement amount of the vehicle in the lateral direction becomes zero (ST4). Therefore, even in a case where the correction of the inclination of the vehicle causes a shift of the position of the vehicle in the lateral direction, it is possible to correct the position of the vehicle in the lateral direction so as to match that of the vehicle in the reference straight moving state.

Concrete embodiments of the present invention have been described in the foregoing, but the present invention is not limited to the above embodiments and may be modified or altered in various ways. For example, the behavior control system 1 may include a yaw rate sensor 51 configured to acquire the yaw rate of the vehicle body and a lateral acceleration sensor 52 configured to acquire the lateral acceleration of the vehicle body. In this case, the rotation determination unit 14 may be configured to acquire the yaw rate and the lateral acceleration based on the temporal change of the feature points P and fuses the acquired yaw rate and lateral acceleration with the yaw rate acquired by yaw rate sensor 51 and the lateral acceleration acquired by the lateral acceleration sensor 52 (data fusion), so that the vehicle body control unit 16 performs the vehicle control based on the fused yaw rate and the fused lateral acceleration. Also, the behavior control system 1 may be configured to calculate correction amounts for correcting the yaw rate acquired by the yaw rate sensor 51 and the lateral acceleration acquired by the lateral acceleration sensor 52 according to the yaw rate and the lateral acceleration acquired by the rotation determination unit 14 based on the temporal change of the feature points P, and to perform the vehicle control based on the yaw rate and the lateral acceleration that are corrected with the correction amounts.

When the steering angle is small and the vehicle is traveling obliquely in a gradual manner and hence the movement of the feature points P due to inclination (rotation) of the vehicle is small, it may be possible to calculate the vanishing point Q. In such a case, the inclination correction and the lateral movement amount correction may be performed simultaneously.

In the above embodiment, the steering device 2C, the powertrain 2A, and the brake device 2B were controlled in step ST3 and step ST4, but the present invention is not limited to such an embodiment. For example, only the steering device 2C may be controlled.

In the above embodiment, the behavior control system 1 was applied to a motor vehicle as a moving body, but the moving body to which the behavior control system 1 may be applied is not limited to such an embodiment. The moving body to which the behavior control system 1 may be applied may be any moving body that can move in the fore and aft direction and lateral direction, such as a watercraft, airplane, or drone, for example.

The invention claimed is:

1. A behavior control system for a moving body, comprising:
   a control-performing device configured to control a behavior of the moving body,
   a camera fixed at the moving body and configured to capture images in front of the moving body with respect to a travel direction,
   a control device including a storing device storing a position of reference vanishing point in the images and a processor configured to control behaviors of the moving body by controlling the control-performing device based on judgments of the moving body behavior by comparing the position of the reference vanishing point stored by the storing device and the images captured by the camera,
   wherein the processor extracts feature points from the images captured by the camera, decides whether the feature points are moving radially outward from a single point, and obtains the single point as a vanishing point when the processor decides that the feature points are moving radially, and judges that the moving body travels obliquely when a shift of the vanishing point compared to the reference vanishing point is detected.

2. The behavior control system according to claim 1, wherein the storing device stores the reference vanishing point as the vanishing point detected in the images when the moving body is in a straight moving state, and
   the processor acquires a movement amount of the moving body in a lateral direction based on a distance between the vanishing point and the reference vanishing point in the images.

3. The behavior control system according to claim 1, wherein the processor controls the control-performing device so that the feature points move radially outward from the reference vanishing point.

4. The behavior control system according to claim 1, wherein the processor controls the control-performing device to modify the behavior of the moving body when a state of the feature points extracted differs from a state in which the feature points move radially outward from the reference vanishing point.

5. The behavior control system according to claim 1, wherein the processor controls the control-performing device to adjust the shift of the vanishing point and the reference vanishing point to zero.

6. The behavior control system according to claim 1, wherein the processor controls the control-performing device so as to adjust the shift of the vanishing point and the reference vanishing point to zero after controlling the control-performing device such that the feature points move radially outward from the reference vanishing point.

7. A behavior control system for a moving body, comprising:
   a control-performing device configured to control a behavior of the moving body,
   a camera fixed at the moving body and configured to capture images in front of the moving body with respect to a travel direction,
   a control device including a storing device storing a position of reference vanishing point in the images and a processor configured to control behaviors of the moving body by controlling the control-performing device based on a movement amount of the moving body in a lateral direction by comparing the position of the reference vanishing point stored by the storing device and the images captured by the camera,
   wherein the processor extracts feature points from the images captured by the camera, decides whether the feature points are moving radially outward from a single point, and obtains the single point as a vanishing point when the processor decides that the feature points are moving radially, and acquires the movement amount of the moving body in the lateral direction based on a distance between the vanishing point and the reference vanishing point in the images.

* * * * *